US009586434B2

(12) United States Patent
Nishihata et al.

(10) Patent No.: US 9,586,434 B2
(45) Date of Patent: Mar. 7, 2017

(54) PRINTING APPARATUS FOR PRINTING IMAGE ON PRINTING MEDIUM TO BE ENCLOSED IN ENVELOPE

(71) Applicant: RISO KAGAKU CORPORATION, Minato-ku, Tokyo (JP)

(72) Inventors: Masahiro Nishihata, Tsukuba (JP); Yoshiyuki Hara, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/801,252

(22) Filed: Jul. 16, 2015

(65) Prior Publication Data

US 2016/0026411 A1 Jan. 28, 2016

(30) Foreign Application Priority Data

Jul. 25, 2014 (JP) ................................ 2014-152043

(51) Int. Cl.

| | |
|---|---|
| ***G06F 3/12*** | (2006.01) |
| ***B43M 3/04*** | (2006.01) |
| ***G03G 15/00*** | (2006.01) |
| ***B65H 45/14*** | (2006.01) |

(52) U.S. Cl.

CPC ........... *B43M 3/045* (2013.01); *B65H 45/142* (2013.01); *B65H 45/148* (2013.01); *G03G 15/6538* (2013.01); *B65H 2301/132* (2013.01); *B65H 2301/17* (2013.01); *B65H 2301/4213* (2013.01); *B65H 2801/66* (2013.01); *G03G 2215/00514* (2013.01); *G03G 2215/00877* (2013.01); *G03G 2215/2083* (2013.01)

(58) Field of Classification Search

None

See application file for complete search history.

(56) References Cited

U.S. PATENT DOCUMENTS

2005/0252955 A1* 11/2005 Sugai .................... B42D 5/026 229/92.3
2008/0130039 A1* 6/2008 Igarashi ................ G06F 3/1242 358/1.15
2011/0286046 A1* 11/2011 Ohsugi ................ G06K 15/027 358/3.01
2013/0260977 A1* 10/2013 Wakatabi .............. B65D 27/14 493/188

FOREIGN PATENT DOCUMENTS

JP 2012-61807 A 3/2012

* cited by examiner

*Primary Examiner* — Andrew H Lam
(74) *Attorney, Agent, or Firm* — Manabu Kanesaka

(57) ABSTRACT

Folding information and printing surface information, included in content information of a sealed letter creation job, are compared with content printing conditions stored in a storage section, and an appropriate condition (a conveyance path after printing, execution/non-execution of image rotation, and printing page order) is selected such that the position of a window of a windowed envelope is aligned with the position of specifying information printed on a print sheet P to be a content when the print sheet P is enclosed in the envelope. A convey section and a printing section are controlled based on the selected content printing condition.

3 Claims, 8 Drawing Sheets

| PRINTING SURFACE INFORMATION | FOLDING INFORMATION | CONTENT PRINTING CONDITION | | |
|---|---|---|---|---|
| | | TRANSFER PATH | IMAGE ROTATION | PRINTING PAGE |
| SINGLE-SIDED PRINTING | INWARD THREE-FOLDING · FOUR-FOLDING · TWO-FOLDING | SINGLE-SIDED TRANSFER PATH | EXECUTE | DESCENDING ORDER |
| | OUTWARD THREE-FOLDING | DOUBLE-SIDED TRANSFER PATH | EXECUTE | ASCENDING ORDER |
| DOUBLE-SIDED PRINTING | INWARD THREE-FOLDING · FOUR-FOLDING · TWO-FOLDING | — | EXECUTE | ASCENDING ORDER |
| | OUTWARD THREE-FOLDING | — | NON EXECUTE | DESCENDING ORDER |

FIG. 3

| PRINTING SURFACE INFORMATION | FOLDING INFORMATION | CONTENT PRINTING CONDITION | | |
|---|---|---|---|---|
| | | TRANSFER PATH | IMAGE ROTATION | PRINTING PAGE |
| SINGLE-SIDED PRINTING | INWARD THREE-FOLDING · FOUR-FOLDING · TWO-FOLDING | SINGLE-SIDED TRANSFER PATH | EXECUTE | DESCENDING ORDER |
| | OUTWARD THREE-FOLDING | DOUBLE-SIDED TRANSFER PATH | EXECUTE | ASCENDING ORDER |
| DOUBLE-SIDED PRINTING | INWARD THREE-FOLDING · FOUR-FOLDING · TWO-FOLDING | — | EXECUTE | ASCENDING ORDER |
| | OUTWARD THREE-FOLDING | — | NON EXECUTE | DESCENDING ORDER |

INWARD THREE-FOLDING
(DOUBLE-SIDED PRINTING, EXECUTION OF IMAGE ROTATION, ASCENDING ORDER)

FOUR-FOLDING
(DOUBLE-SIDED PRINTING, EXECUTION OF IMAGE ROTATION, ASCENDING ORDER)

TWO-FOLDING
(DOUBLE-SIDED PRINTING, EXECUTION OF IMAGE ROTATION, ASCENDING ORDER)

OUTWARD THREE-FOLDING
(DOUBLE-SIDED PRINTING, NON-EXECUTION OF IMAGE ROTATION, DESCENDING ORDER)

PRINTING APPARATUS FOR PRINTING IMAGE ON PRINTING MEDIUM TO BE ENCLOSED IN ENVELOPE

RELATED APPLICATIONS

The present application is based on, and claims priority from, Japanese Application No. JP2014-152043 filed Jul. 25, 2014, the disclosure of which is hereby incorporated by reference herein in its entirety.

TECHNICAL FIELD

The present invention relates to a printing apparatus which prints a predetermined image on a printing object medium (print sheet) to be a content enclosed in an envelope.

BACKGROUND ART

Japanese Published Unexamined Patent Application No. 2012-61807 discloses a sealed letter creation device. A common printing section performs printing on print sheets to be an envelope form and a content. The common printing section alternately performs printing on the envelope form and the content and discharges the printed results by sealed letter to be created. The envelope form is folded while it is conveyed on a specialized first conveyance path. The content is folded while it is conveyed on a specialized second conveyance path. In an enclosing part, provided in an intersection position between the terminal ends of the both conveyance paths, the print sheet is folded while it is wrapped with the envelope form, thus a sealed letter is created.

SUMMARY OF INVENTION

Technical Problem

Various documents including notifications from public institutions such as a notification of tax payment, bills of particulars of credit cards and the like, and direct mails, are often sent utilizing a "windowed envelope". In the windowed envelope, a predetermined size notch is provided in a front surface of a general envelope. A transparent or semitransparent film is attached to the notch, thus a window is formed. It is possible to check information to specify an addressee and a sender printed on the content from the window without opening the envelope. For example, the information includes destination information (postal code, name, address or domicile) of the addressee, identification information (one-dimensional code (barcode) or two-dimensional code (QR CODE) (registered trademark) or SP code), management number) to identify the addressee and the sender, sender information (postal code, name, address or domicile) of the sender. Hereinbelow, the information will be referred to as "specifying information". There are many user requests for a sealed letter creation device as disclosed in Japanese Published Unexamined Patent Application No. 2012-61807 to create a sealed letter utilizing a windowed envelope.

To respond to the requests, the inventors of the present application have developed a sealed letter creation device for use of a windowed envelope, and as a result, found a problem in use of windowed envelope. That is, for printing with a windowed envelope, even though specifying information is printed in a predetermined position of the content in correspondence with the position of the window of the windowed envelope, the specifying information is not always aligned with the position of the window when it is enclosed in the envelope in accordance with printing a condition of the content.

That is, in FIG. 7A, an image to be printed on a content, rotated at 180° from a normal printing direction on a printing surface, is printed by double-sided printing in ascending page order. When the content is folded inwardly in three, four, and two, the position of the window is aligned with that of the specifying information. However, when the content is folded outwardly in three, the position of the window is not aligned with that of the specifying information, and the created sealed letter is a defective article in which the specifying information cannot be observed from the window. Similarly, in FIG. 7B, an image to be printed on a content, in a normal printing direction, is printed by double-sided printing in descending page order. When the content is folded outwardly in three, the position of the window is aligned with that of the specifying information. However, when the content is folded inwardly in three, four, and two, the position of the window is not aligned with that of the specifying information, and the created sealed letter is a defective article in which the specifying information cannot be observed from the window.

Further, in FIG. 7C, a content not to be folded is enclosed in a windowed A4-size envelope. When an image to be printed, in a normal printing direction, is printed by double-sided printing in descending page order, the position of the window is aligned with that of the specifying information. However, when the image to be printed, rotated at 180°, is printed by double-sided printing in ascending page order, the position of the window is not aligned with that of the specifying information, and the created sealed letter is a defective article in which the specifying information cannot be observed from the window.

Further, in a sealed letter creation device as another device different from the device in Japanese Published Unexamined Patent Application No. 2012-61807 (e.g., a device disclosed in Japanese Published Unexamined Patent Application No. 2012-131543), a printed matter (in e.g. A4 size) not to be folded is enclosed in a commercial windowed envelope (e.g. an A4-size windowed envelope). In this device, the position of the window is not aligned with that of the specifying information in accordance with printing a condition such as printing surface of printing content or printing page order, and the created sealed letter is a defective article in which the specifying information cannot be observed from the window.

Accordingly, the present invention has been made in view of the above problem, and provides a printing apparatus capable of performing print processing on a content in accordance with a sealed letter to be created so as to enable observation of specifying information printed on the content from a window of a windowed envelope.

Solution to Problem

To attain the above-described object, the printing apparatus in a first aspect of the invention includes: a printing section that prints the specifying information on a content enclosed in an envelope; and a control section that makes determination as to execution or non-execution of image rotation of the specifying information printed on the content and as to whether the content is printed in ascending order or descending order of page numbers, based on content information including printing surface information to set at least a printing surface of the content to single-sided or double-sided so as to align the specifying information of the content enclosed in the envelope with a predetermined position in the envelope, and controls the printing section in accordance with a content printing condition determined based on the result of determination.

In the printing apparatus in a second aspect of the invention according to the first aspect, in determination of the content printing condition, determination as to whether the content after single-sided printing is conveyed on a single-sided conveyance path or a double-sided conveyance path is also made.

In the printing apparatus in a third aspect of the invention according to the first aspect or the second aspect, folding information to set folding of the content is included in the content information.

Advantageous Effects of Invention

According to the printing apparatus according to the first aspect of the invention, the content printing condition is appropriately selected based on printing surface information included in content information to create the content. The printing section is controlled such that the specifying information printed on the content is in a predetermined position of the envelope when the content is enclosed in the envelope. It is possible to always align the position of the specifying information printed on the content with the position of the window of the envelope when a sealed letter is created.

Further, according to the printing apparatus in the second aspect of the invention, in determination of the content printing condition, it is determined whether the content subjected to single-sided printing is to be conveyed on a single-sided conveyance path or a double-sided conveyance path. The front/rear side of the content subjected to single-sided printing is appropriately turned over in correspondence with position of the window of the envelope and position of the specifying information printed on the content. It is possible to always align the position of the specifying information printed on the content with the position of the window of the envelope when a sealed letter is created.

Further, according to the printing apparatus in the third aspect of the invention, the content information includes folding information of the content. When a sealed letter is created even with a sealed letter creation device having plural folding patterns, it is possible to align the position of the specifying information (e.g. address) of the enclosed content with the position of the window of the envelope.

BRIEF DESCRIPTION OF DRAWINGS

FIG. 3 is a table showing setting contents of a content printing condition corresponding to content information.

DESCRIPTION OF EMBODIMENTS

The embodiments for executing the present invention will be described in detail below making reference to the attached figures. Furthermore, the aspects of the embodiments place no limitation on the invention, and other embodiments that can be executed by a person of ordinary skill in the art based on the embodiments, in addition to the examples and operating techniques are all included in the scope of the present invention.

[Sealed Letter Creation Device]

First, a sealed letter creation device 100 in which a printing apparatus 1 according to the present invention is incorporated will be described.

Figure 1:
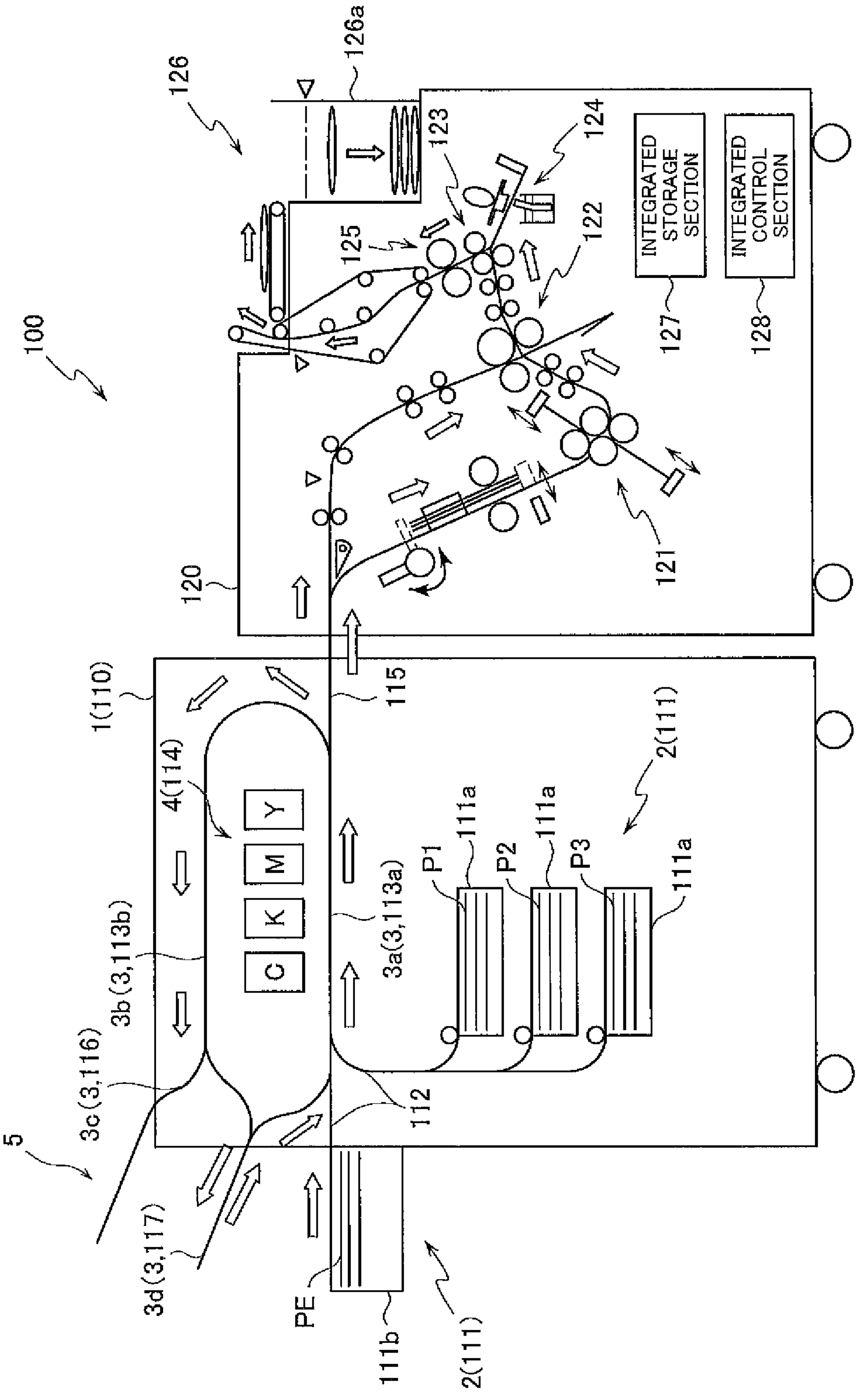
FIG. 1 is a schematic figure illustrating a configuration of a sealed letter creation device in which a printing apparatus according to the present invention is incorporated.

As shown in FIG. 1, the sealed letter creation device 100 has a printing unit (printer) 110 to perform predetermined print processing on a print sheet P to be a content enclosed in a sealed letter and an envelope form PE in which the print sheet P is enclosed, and an enclosing-sealing unit 120 (enclosing-sealing device) to perform necessary folding on the print sheet P and the envelope form PE subjected to the predetermined print processing with the printing unit 110, enclose the print sheet P with the envelope form PE by wrapping the print sheet P with the envelope form PE, and seal the envelope, thus to create a sealed letter.

<Printing Unit>

The printing unit 110 is configured to perform predetermined printing on the envelope form PE and the content P, and to discharge the printed sheet to the enclosing-sealing unit 120 in the subsequent stage.

More particularly, the printing unit 110 has a paper feeding section 111 to feed plural types of print sheets (sheet type print sheets P1 to P3 to be the print sheets P and the envelope form PE) stacked on a paper feed tray 111*a* inside a casing and a paper feed table 111*b* on a casing side surface at predetermined timings, a conveyance path 113 including a first conveyance path 113*a* to horizontally convey the print sheet conveyed from an introduction path 112 and a closed-loop type second conveyance path 113*b* to which the print sheet P is conveyed upon double-sided printing or the like via the first conveyance path 113*a*, a printing part 114 to perform print processing on the print sheet P conveyed on the conveyance path 113, a first discharge path 115 to discharge the print sheet P to the enclosing-sealing unit 120, a second discharge path 116 to discharge the print sheet P conveyed on the second conveyance path 113*b* to the outside the casing, and a switchback path 117 to receive the print sheet p conveyed on the second conveyance path 113*b* then forward the print sheet backward, thus return the print sheet P to the second conveyance path 113*b* to turn over the front/rear side of the print sheet P.

Note that the printing unit 110 corresponds to the printing apparatus 1 according to the present invention. A configuration and processing content to solve the problem in sealed-letter creation processing using a windowed envelope with a conventional sealed letter creation device 100 will be described later.

<Enclosing-Sealing Unit>

The enclosing-sealing unit 120 performs necessary folding on the envelope form PE and the print sheet P, and performs enclosing-sealing processing so as to wrap the print sheet P with the envelope form PE, thus creates a sealed letter. Note that in the present embodiment, the enclosing-sealing unit 120 folds the envelope form PE in three to wrap the print sheet P. However, regarding the number of foldings and way of folding of the envelope form PE, there are various forms in correspondence with shape and purpose of sealed later to be created, and accordingly, the number of foldings and folding are not particularly limited.

More particularly, the enclosing-sealing unit 120 has a print sheet folding section 121 including plural folding rollers to perform predetermined folding as needed while conveying the print sheet P, an accommodating section 122 to accommodate the print sheet P with the envelope form PE while folding a part of the envelope form PE so as to wrap the print sheet P with the envelope form PE, in accordance with convey, a flap folding section 123 to fold the envelope form PE in which the print sheet P is accommodated with the accommodating section 122, to form a flap, and shape the envelope form PE into an envelope shape, a water coating processing section 124, as a standby path for positioning of flap folding, to moisten a remoistening glue part previously conveyed to the envelope form PE with water, a sealing section 125 to fold the flap part in accordance with convey and seal the envelope subjected to the water moistening, and a discharge section 126 to convey the sealed letter subjected to the sealing processing upward to the outside the apparatus casing, then discharge-convey the sealed letter horizontally to a discharge tray 126*a*.

Further, the sealed letter creation device 100 has an integrated storage section 127 to hold information, necessary to drive the respective constituent elements of the sealed letter creation device 100, such as a sealed letter creation job where conditions necessary for sealed letter creation are set, and an integrated control section 128 to perform driving control on the respective constituent elements configuring the sealed letter creation device 100.

Note that the sealed letter creation job includes information necessary to create a sealed letter, such as the number of sealed letters to be created, envelope information on an envelope created with the envelope form PE (e.g. the number of sheets, a form size, an envelope size when the envelope form PE becomes an envelope shape, the existence/absence of window, printing condition (single-sided printing/double-sided printing), print image data to be printed, and information indicating the way of folding), and content information on a print sheet to be the print sheet P (e.g., the number of copies, information on the number of contents, an output size, single-sided printing/double-sided printing setting, data on a print image to be printed, the folding, and information indicating the print position of specifying information).

Further, the sealed letter creation job may be acquired with the sealed letter creation device 100 from an external terminal device such as a user's PC, or acquired via an auxiliary storage device such as a USB memory holding the previously-set sealed letter creation job. Otherwise, the apparatus main body may be provided with a setting input unit configured with various input keys and a touch panel to set the sealed letter creation job. Further, the sealed letter creation job may be acquired via a communication network from an external server holding the previously set sealed letter creation job.

The printing apparatus 1 according to the present invention corresponds to the above-described printing unit 110. The printing apparatus 1 performs predetermined print processing on the print sheet P based on the content information included in the sealed letter creation job such that, when the print sheet P on which the specifying information to be described later is printed is enclosed as a content in an envelope formed with the envelope form PE and sealed, the specifying information is observable from the window provided in the envelope.

[Printing Apparatus]

<Apparatus Configuration>

Figure 2:
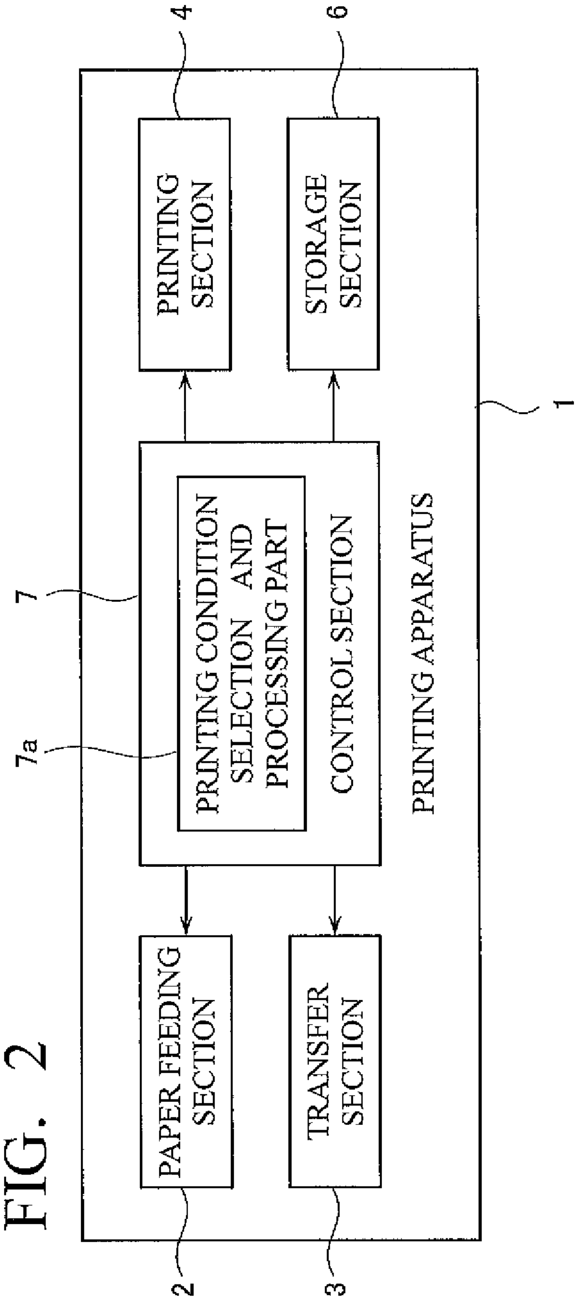
FIG. 2 is a functional block diagram of the present apparatus.

Next, the printing apparatus 1 according to the present invention will be described. As shown in FIG. 1 or 2, the printing apparatus 1 according to the present embodiment has a paper feeding section 2, a conveyance path 3, a printing section 4, a paper discharge section 5, a storage section 6, and a control section 7.

Note that in the following description, in the envelope form PE used with the sealed letter creation device 100, a predetermined sized notch is formed in a surface as a front surface of the envelope, and a transparent or semitransparent film is attached to the notch as a window having a predetermined shape.

Further, as image information to be printed on the paper surface, content information as information to be notified to the addressee (characters and image indicating the content of notification to be notified to the addressee), information to specify the addressee and the sender printed on the content from the window without opening the envelope (e.g., it includes addressee destination information (postal code, name, address or domicile), identification information to identify the addressee and the sender (one-dimensional code (barcode) and two-dimensional code (QR code (registered trademark) or SP code), and a serial number), sender information (postal code, name address or domicile), hereinbelow, it will be referred to as "specifying information"), are printed on the print sheet P to be a content. The printing position of the specifying information and the size of the printing area are previously set so as to be aligned with the position of the window of the envelope form PE to be used when the content is enclosed normally.

The paper feeding section 2 corresponds to the paper feeding section 111 of the printing unit 110. The paper feeding section 2 feeds plural types of print sheets (sheet type print sheets P1 to P3 to be the print sheets P and the envelope form PE) stacked on the paper feed tray 111*a* provided inside the apparatus casing and the paper feed table 111*b* on the casing side surface to the printing section 4, at predetermined timings in correspondence with sealed letter creation job.

The convey section 3 has a horizontal conveyance path 3*a* to perform image forming on the print sheet P to be a content fed from the paper feeding section 2 (corresponding to the first conveyance path 113*a* in the printing unit 110), and a closed-loop shaped circular path 3*b* to turn over the print sheet P where the image formation has been performed on the surface and return the print sheet P to the horizontal conveyance path 3*a* (corresponding to the second conveyance path 113*b* in the printing unit 110).

Further, a paper discharge path 3*c* to discharge the print sheet P where the image formation has been performed on the surface with the printing section 4, with the surface turned downward (faced down), to the paper discharge section 5 (corresponding to the second discharge path 116 in the printing unit 110) is provided on the downstream side of the circular path 3*b*. Further, a switchback path 3*d* forming a dead-end structure to reciprocate the print sheet P guided from the circular path 3*b* and return the print sheet P to the circular path 3*b* so as to turn over the front/rear side of the print sheet P (corresponding to the switchback path 117 in the printing unit 110) is provided on the side slightly downward from a branch point of the paper discharge path 3*c*.

That is, the print sheet P conveyed from the paper feeding section 2 is conveyed via the horizontal conveyance path 3*a* to the printing section 4. Then the printing section 4 forms an image on the surface of the print sheet P, and discharges the print sheet P, without any rotation, to the subsequent enclosing-sealing unit 120. This is so-called "single-sided printing". The print sheet P subjected to the single-sided printing, with the image forming surface faced upward, is discharged to the enclosing-sealing unit 120. Otherwise, the print sheet P subjected to the single-sided printing is not discharged but guided through the circular path 3*b* to the switch back path 3*d*, and the front/rear side of the print sheet P is turned over with the switchback path 3*d* and is returned to the circular path 3*b*. Then image formation is performed on the rear side of the print sheet P with the printing section 4 while the print sheet P is conveyed again along the circular path 3*b*. This is so-called "double-sided printing". The print sheet P subjected to the double-sided printing is discharged, with its rear side faced upward, to the enclosing-sealing unit 120. Further, the convey section 3 conveys the print sheet P, subjected to the single-sided printing, on a single-sided conveyance path or a double-sided conveyance path to be described later, based on a conveyance path instruction from the control section 7 when the single-sided printing is performed on the print sheet P.

Further, when the print sheet P is sent from the paper feeding section 2 to the horizontal conveyance path 3*a* then conveyed, and the printing section 4 forms an image on the surface of the print sheet P and then discharges the print sheet P to the paper discharge section 5, the print sheet P in a faced down status is discharged.

The printing section 4 corresponds to the printing part 114 in the printing unit 110. In the printing section 4 as a part to form an image on the print sheet P, four ink-jet heads C, M, Y, and K to discharge C (cyan), M (magenta), Y (yellow), and black (K) inks, are provided in parallel above the horizontal conveyance path 3*a*. The printing section 4 discharges the inks on the upper surface of the print sheet P conveyed along the horizontal conveyance path 3*a*, thus forms a desired image. As print processing with the printing section 4, upon single-sided printing, a printing image is printed from a front end side in the convey direction. Upon printing on the rear surface side by double-sided printing, the image is rotated and printed in an appropriate direction in correspondence with a longer-side binding or shorter-side binding instruction.

Further, when the printing section 4 receives an image rotation instruction from the control section 7, it performs print processing, with the image rotated in correspondence with the instruction. Further, the printing section 4 performs print processing with the image on the print sheet P in descending or ascending order, based on a printing page order instruction from the control section 7.

Note that as the printing unit 110, any unit may be used as long as it performs desired image formation on the print sheet P and the envelope form PE in correspondence with creation content of a sealed letter to be created. Accordingly, various printing methods such as screen printing and electrophotographic printing, in addition to the ink-jet printing method, may be employed.

The paper discharge section 5 receives the print sheet P, discharged through the paper discharge path 3*c*, to the outside the casing. The print sheet P discharged to the paper discharge section 5, in the faced down status, is sequentially stacked.

The storage section 6 has various storage devices e.g. semiconductor memories including a nonvolatile memory such as an EEPROM or a flash memory, and a volatile memory such as a DRAM or an SDRAM, and a HDD. The storage section 6 holds a driving control program necessary to drive the respective constituent elements of the printing apparatus 1.

Further, the storage section 6 holds the content printing condition in which a printing condition for the print sheet P based on the content information (folding information and printing surface information) included in the sealed letter creation job is set.

As shown in FIG. 3, the content printing condition is information in which various conditions (conveyance path after printing (single-sided conveyance path or double-sided conveyance path), the printing page order (ascending order or descending order), and the execution/non-execution of image rotation) are set, based on folding information in which the folding (inward three-folding, four-folding, outward three-folding and two folding) included in the content information is set, and the printing surface information in which the printing method (single-sided or double-sided printing) is set, such that, when the print sheet P is enclosed as a content in an envelope, the specifying information printed on the print sheet P is aligned with a predetermined position of the envelope (the position of the window). Note that when predetermined folding is performed on the print sheet P subjected to print processing in accordance with the content printing condition set with the content information and the folded print sheet is accommodated in the envelope form PE, the specifying information is printed in a position aligned with the position of the window.

Note that the "conveyance path after printing" in the content printing condition is information on a conveyance path through which the print sheet P subjected to single-sided printing is to be passed when the print sheet P is conveyed to the enclosing-sealing unit 120. That is, the "single-sided conveyance path" is selected to convey the print sheet P subjected to the single-sided printing through the horizontal conveyance path 3*a* to the enclosing-sealing unit 120. The print sheet P, in the status after the single-sided printing, is conveyed to the enclosing-sealing unit 120. Further, the "double-sided conveyance path" is selected to convey the print sheet P subjected to the single-sided printing, through the circular path 3*b* and the switchback path 3*d*, to the enclosing-sealing unit 120. The print sheet P, front/rear-side turned from the status after the single-sided printing, is conveyed to the enclosing-sealing unit 120. Note that when the print sheet P is subjected to double-sided printing, no conveyance path is selected after the printing, and the print sheet P in the status after the double-sided printing is conveyed to the enclosing-sealing unit 120.

In the content printing condition, the "execution/non-execution of image rotation" is information selecting to execute or not to execute 180° rotation of the direction of a printing image to be printed on the print sheet P. That is, when the "execution of image rotation" is selected, print processing is performed with the printing image rotated by 180° on the printing surface from a normal image direction. When the "non-execution of image rotation" is selected, the print processing is performed with the printing image in the normal direction without image rotation.

In the content printing condition, the "printing page order" is information selecting ascending order (when the print sheets P subjected to printing are sequentially stacked, the page number is sequentially increased from a minimum number) or descending order (when the print sheets P subjected to printing are sequentially stacked, the page number is sequentially decreased from a maximum number) as the printing order for the print sheets P. That is, when the "ascending order" is selected, printing is performed such that the page number of the print sheets P subjected to the printing is sequentially increased from a minimum number. When the "descending order" is selected, printing is performed such that the page number of the print sheets P subjected to the printing is sequentially decreased from a maximum number.

Note that the content printing condition shown in FIG. 3 is an example of the condition to set the printing surface of the specifying information on the surface side upon completion of folding process with the enclosing-sealing unit 120. Accordingly, when it is configured that the printing surface of the specifying information is on the rear surface side after the completion of the folding process in accordance with the specification of the enclosing-sealing unit 120, the content of the content printing condition shown in FIG. 3 is arbitrarily changed in accordance with the specification.

The control section 7, having a CPU (Central Processing Unit), a ROM (Read Only Memory), and a RAM (Random Access Memory), or a processor having the functions of these units such as an MPU (Micro-Processing Unit), performs driving control on the respective constituent elements of the printing apparatus 1 in accordance with the driving control program stored in the storage section 6.

Further, the control section 7 has a printing condition selection and processing part 7*a* to determine the printing condition for the print sheet P such that the specifying information printed on the print sheet P is aligned with the position of the window or the envelope when the print sheet P is enclosed in an envelope, based on the content information included in the sealed letter creation job.

The printing condition selection and processing part 7*a* compares the folding information and the printing surface information in the content information included in the sealed letter creation job with the content printing condition stored in the storage section 6, selects an appropriate printing condition, and outputs control instructions (a conveyance path instruction, an image rotation instruction, and a printing page order instruction) corresponding to the selected printing condition, to the convey section 3 and the printing section 4.

<Difference in Print Processing According to Content Printing Condition>

CONDITION EXAMPLE 1

Figure 4A:
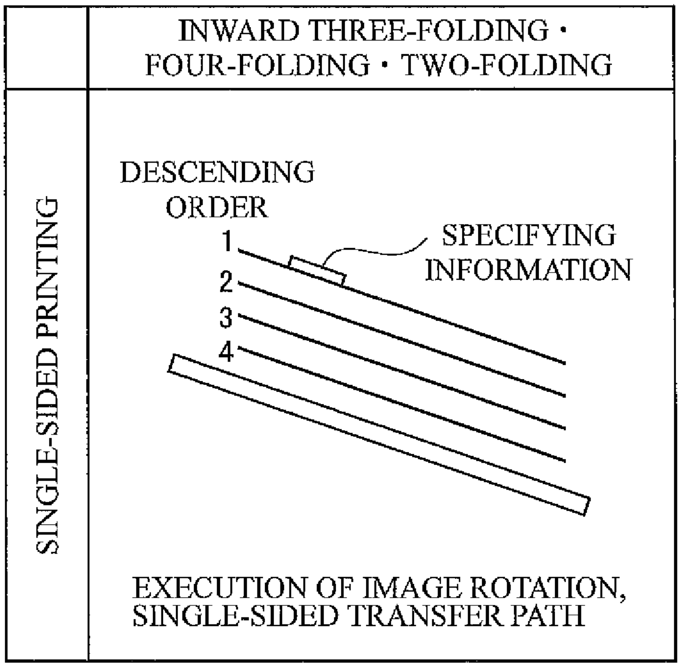
FIGS. 4A to 4D illustrate statuses of a print sheet subjected to printing in correspondence with a selected content printing condition.

As shown in FIG. 3, the printing surface information of the print sheet P is set to "single-sided printing" and the folding information is set to "one of inward three-folding, four-folding, and two-folding", as content information. In the printing condition selection and processing part 7*a*, as a content printing condition, the "single-sided conveyance path" is selected as the conveyance path after printing, and the "execution of image rotation" and the printing page order "descending order" are selected. The convey section 3 and the printing section 4 are drive-controlled in accordance with control instructions corresponding to the selected condition. Then, the status of the print sheet P subjected to the print processing in correspondence with the above-described content printing condition, when conveyed to the print sheet folding section 121 of the enclosing-sealing unit 120, is as shown in FIG. 4A.

CONDITION EXAMPLE 2

Figure 4B:
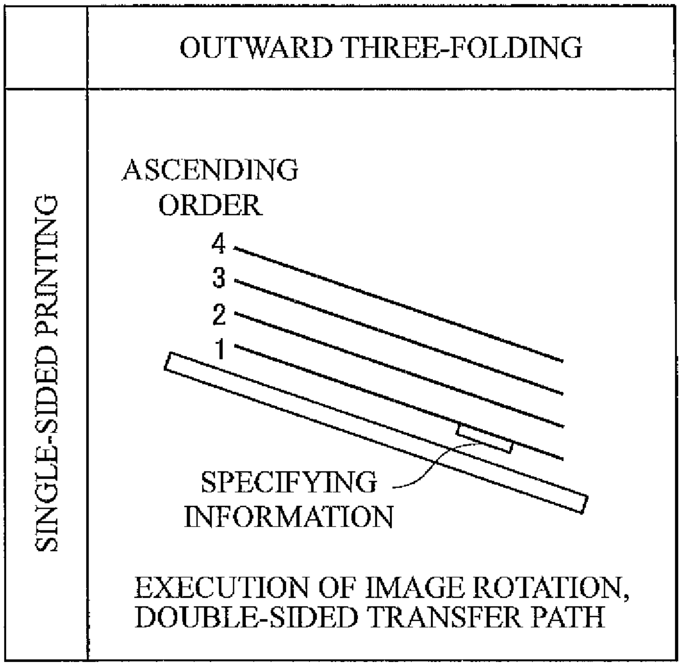

As shown in FIG. 3, the printing surface information of the print sheet P is set to "single-sided printing" and the folding information, to "outward three-folding", as content information. In the printing condition selection and processing part 7*a*, as a content printing condition, the "double-sided conveyance path" is selected as the conveyance path after printing, and the "execution of image rotation" and the printing page order "ascending order" are selected. The convey section 3 and the printing section 4 are drive-controlled in accordance with control instructions corresponding to the selected condition. Then, the status of the print sheet P subjected to the print processing in correspondence with the above-described content printing condition, when conveyed to the print sheet folding section 121 of the enclosing-sealing unit 120, is as shown in FIG. 4B.

CONDITION EXAMPLE 3

Figure 4C:
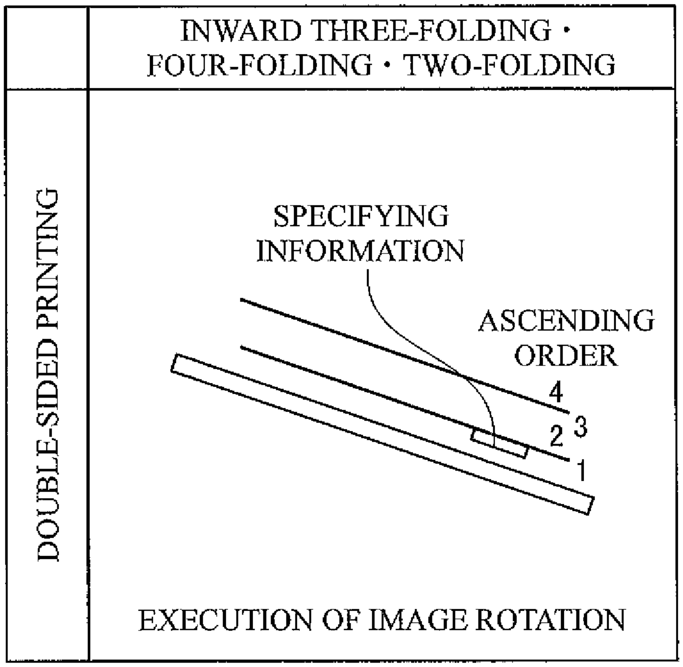

As shown in FIG. 3, the printing surface information of the print sheet P is set to "double-sided printing" and the folding information, to "one of inward three-folding, four-folding, and two-folding", as content information. In the printing condition selection and processing part 7*a*, as a content printing condition, the "execution of image rotation" and the printing page order "ascending order" are selected. The convey section 3 and the printing section 4 are drive-controlled in accordance with control instructions corresponding to the selected condition. Then, the status of the print sheet P subjected to the print processing in correspondence with the above-described content printing condition, when conveyed to the print sheet folding section 121 of the enclosing-sealing unit 120, is as shown in FIG. 4C.

CONDITION EXAMPLE 4

Figure 4D:
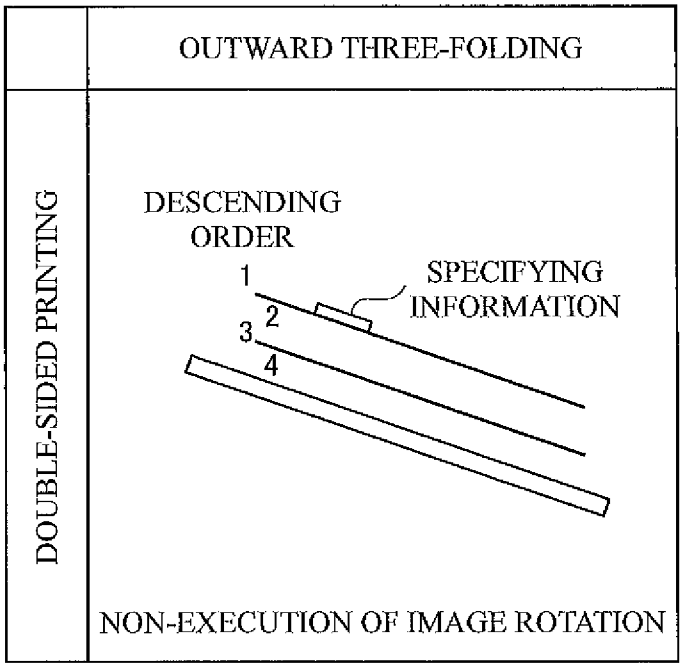

As shown in FIG. 3, the printing surface information of the print sheet P is set to "double-sided printing" and the folding information, to "outward three-folding", as content information. In the printing condition selection and processing part 7*a*, as a content printing condition, the "non-execution" of image rotation and the printing page order "descending order" are selected. The convey section 3 and the printing section 4 are drive-controlled in accordance with control instructions corresponding to the selected condition. Then, the status of the print sheet P subjected to the print processing in correspondence with the above-described content printing condition, when conveyed to the print sheet folding section 121 of the enclosing-sealing unit 120, is as shown in FIG. 4D.

<Processing Operation>

Next, a series of processing operations based on the content printing condition selected from the content information of the sealed letter creation job, upon operation of the above-described printing apparatus 1 incorporated in the sealed letter creation device 100, will be described with reference to FIGS. 3 to 6B.

In this example, on the assumption that double-sided print processing is set as content information, the processing operations are performed based on the content printing condition selected in correspondence with folding pattern (four patterns, i.e., inward three-folding, four-folding, two-folding and outward three-folding). Further, as the specification of the enclosing-sealing unit 120, the specifying information of the print sheet P is on the upper surface after the folding process.

First, when the sealed letter creation job set by the user is started, the control section 7 checks the content information from the job content. Next, the control section 7 refers to the content information and the content printing condition stored in the storage section 6, then selects a content printing condition conforming to the content information, and performs driving control on the convey section 3 and the printing section 4.

Figure 5A:
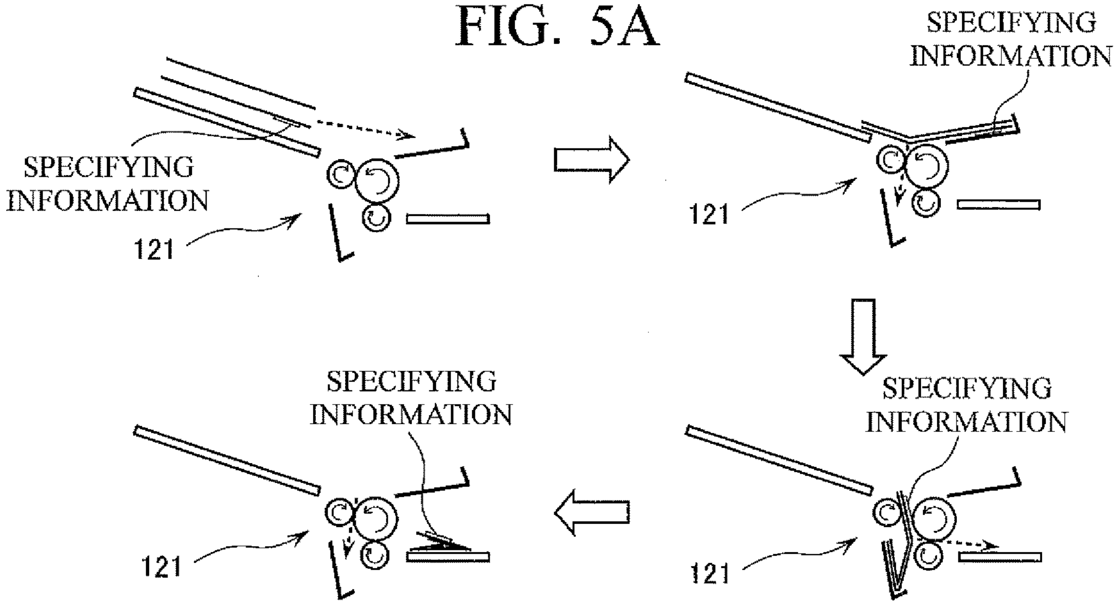
FIG. 5A illustrates the flow of folding process according to the content printing condition selected when the content information indicates double-sided printing and inward three-folding.
Figure 5B:
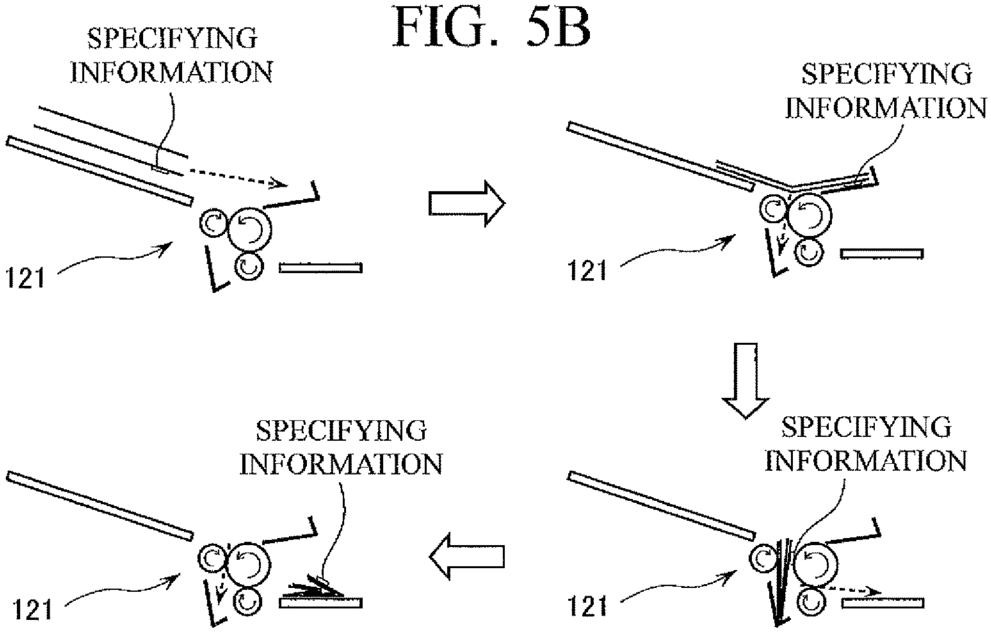
FIG. 5B illustrates the flow of the folding process according to the content printing condition selected when the content information indicates double-sided printing and four-folding.

That is, as the content information, when the printing surface information regarding the print sheet P is “double-sided printing” and the folding information is “inward three-folding”, the “execution” of image rotation and the “ascending order” of the print page order are selected based on the content printing condition shown in FIG. 3. When the convey section 3 and the printing section 4 are drive-controlled in accordance with the selected content printing condition, the print sheet P, in a status shown in FIG. 4A, is sent to the print sheet folding section 121. Then as shown in FIG. 5A, the inward three-folding is performed on the print sheet P in this status. Then the specifying information is on the upper surface after the completion of the folding process. The position of the specifying information is aligned with the position of the window when the print sheet P is accommodated in the envelope form PE.

Further, as the content information, when the printing surface information of the print sheet P is set to “double-sided printing” and the folding information is set to “four-folding”, the “execution” of image rotation and the print page order “ascending order” are selected based on the content printing condition shown in FIG. 3. When the convey section 3 and the printing section 4 are drive-controlled in accordance with the selected content printing condition, the print sheet P, in a status shown in FIG. 4B, is sent to the print sheet folding section 121. Then as shown in FIG. 5A, the four-folding is performed on the print sheet P in this status. Then the specifying information is on the upper surface after the completion of the folding process. The position of the specifying information is aligned with the position of the window when the print sheet P is accommodated in the envelope form PE.

Figure 6A:
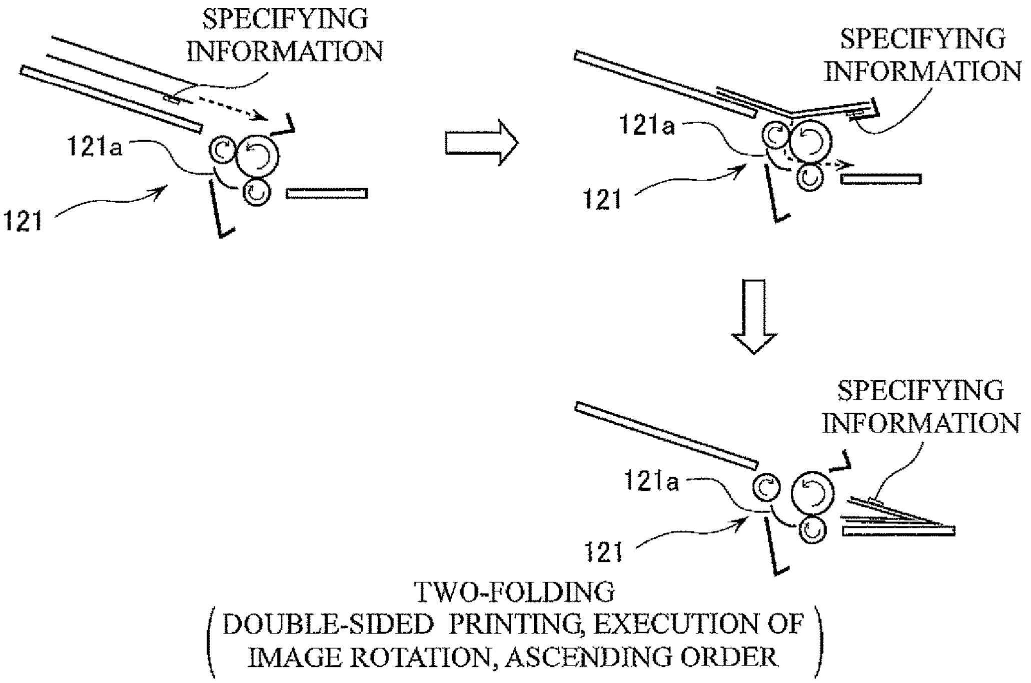
FIG. 6A illustrates the flow of the folding process according to the content printing condition selected when the content information indicates double-sided printing and two-folding.

Further, as the content information, when the printing surface information of the print sheet P is set to “double-sided printing” and the folding information is set to “two-folding”, the “execution” of image rotation and the print page order “ascending order” are selected based on the content printing condition shown in FIG. 3. When the convey section 3 and the printing section 4 are drive-controlled in accordance with the selected content printing condition, the print sheet P, in a status shown in FIG. 4C, is sent to the print sheet folding section 121. Then as shown in FIG. 6A, the two-folding is performed on the print sheet P in this status. Then the specifying information is on the upper surface after the completion of the folding process. The position of the specifying information is aligned with the position of the window when the print sheet P is accommodated in the envelope form PE.

Note that as shown in FIG. 6A, in the case of two-folding, control is performed such that a path switching member 121*a* is moved so as to change the conveyance path and folding is performed only once with a folding roller.

Figure 6B:
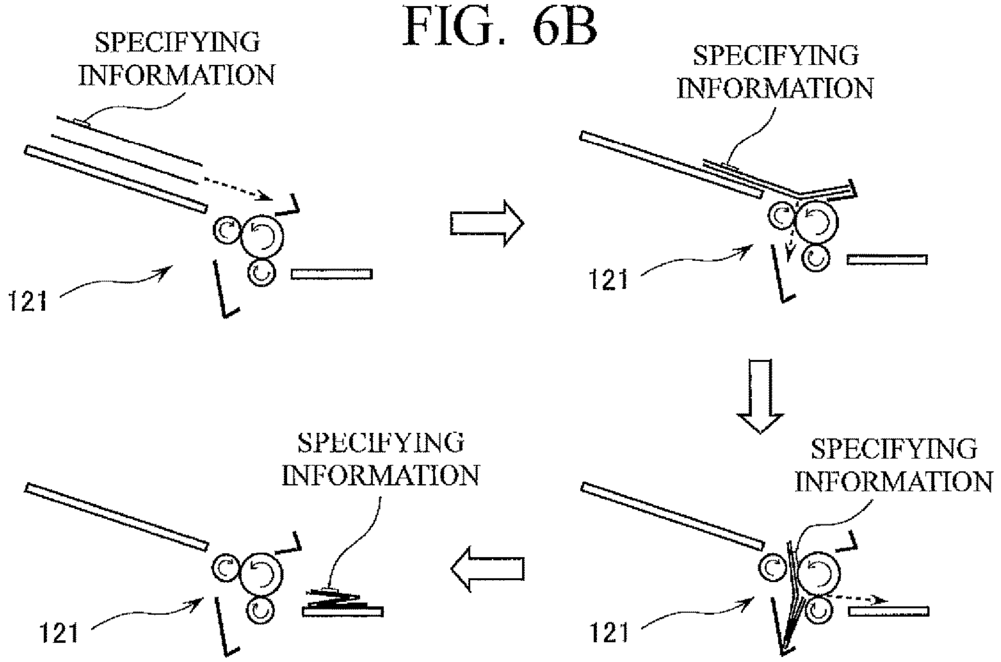
FIG. 6B illustrates the flow of the folding process according to the content printing condition selected when the content information indicates double-sided printing and outward three-folding.
Figure 7A:
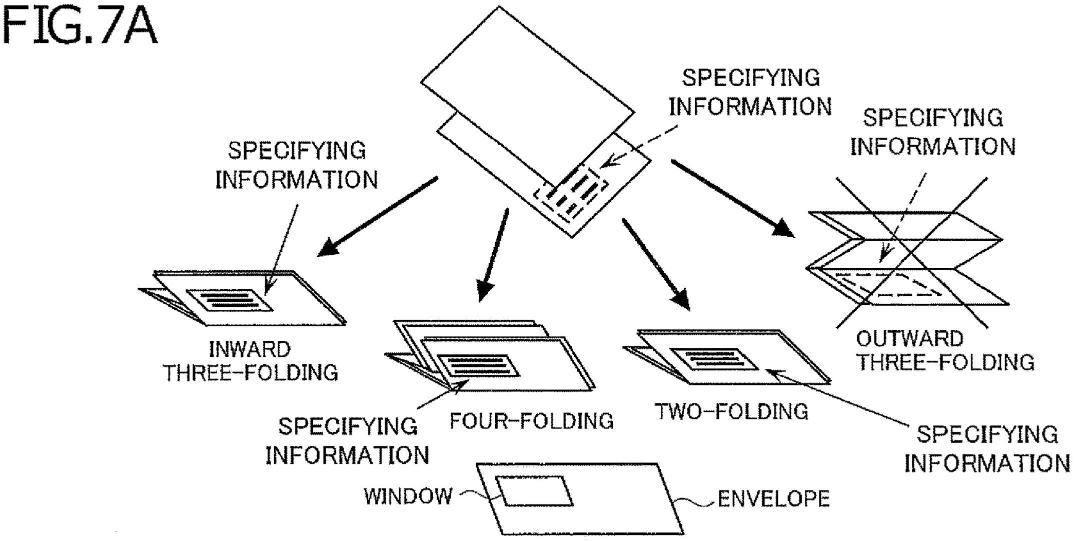
FIGS. 7A and 7B are conceptual diagrams showing the difference in positional relation between specifying information of the content and the window of the envelope in correspondence with a folding pattern and a content printing condition in a conventional apparatus.
Figure 7B:
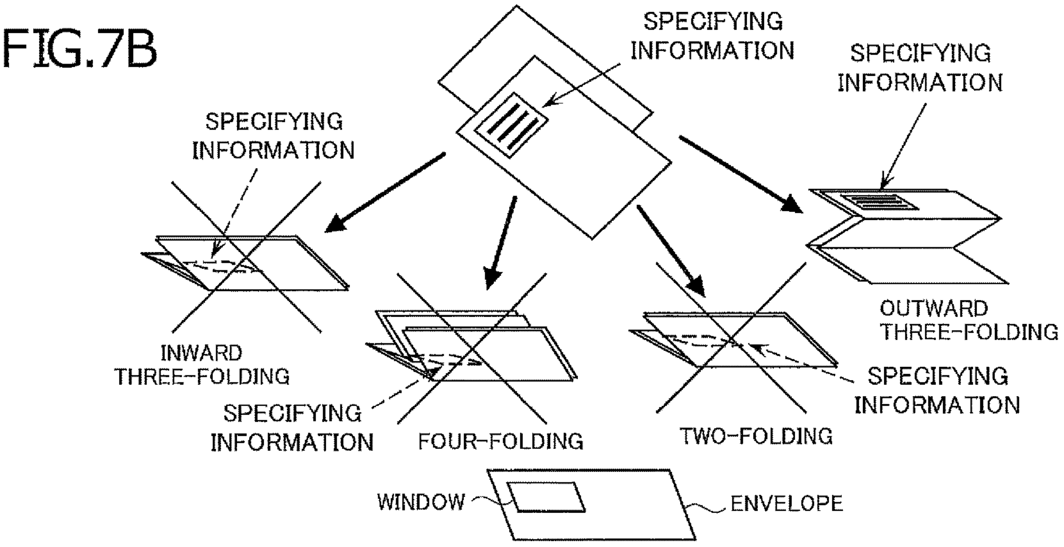
Figure 7C:
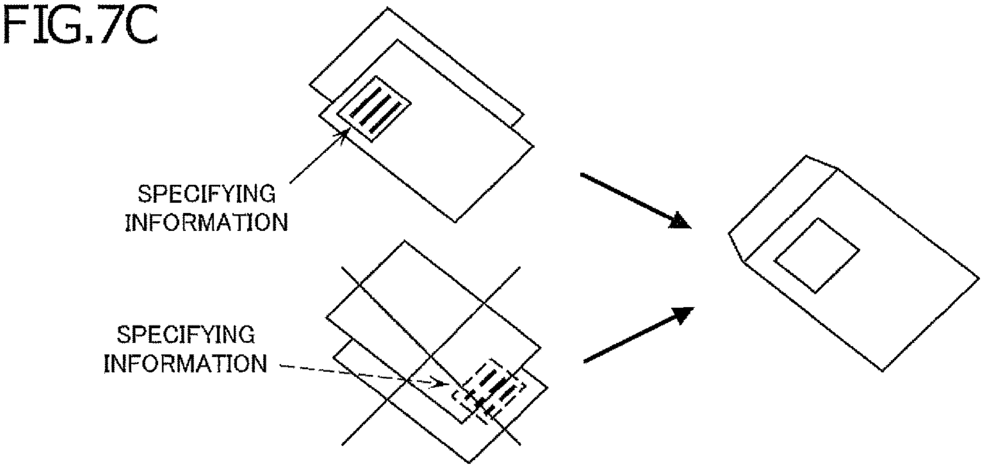
FIG. 7C is a conceptual diagram showing the difference in the positional relation between the specifying information of a content not to be folded and the window of the envelope in correspondence with a printing condition for the content in a conventional apparatus.

Further, as the content information, when the printing surface information of the print sheet P is set to “double-sided printing” and the folding information, to “outward three-folding”, the “non-execution” of image rotation and the print page order “descending order” are selected based on the content printing condition shown in FIG. 3. When the convey section 3 and the printing section 4 are drive-controlled in accordance with the selected content printing condition, the print sheet P, in a status shown in FIG. 4D, is sent to the print sheet folding section 121. Then as shown in FIG. 6B, the outward three-folding is performed on the print sheet P in this status. Then the specifying information is on the upper surface after the completion of the folding process. The position of the specifying information is aligned with the position of the window when the print sheet P is accommodated in the envelope form PE.

As described above, the above-described printing apparatus 1 compares the folding information and the printing surface information included in the content information of the sealed letter creation job with the content printing condition stored in the storage section 6, and selects an appropriate condition. The printing apparatus 1 controls the printing section 4 based on the selected content printing condition to perform print processing on the print sheet P. Even in the sealed letter creation device 100 having plural folding patterns for the print sheet P, it is possible to perform print processing on the print sheet P such that the specifying information printed on the print sheet P is in a predetermined position in the envelope upon completion of sealed letter. That is, in the sealed letter created in the above-described embodiment, the specifying information printed on the print sheet P is always aligned with the window of the envelope in a predetermined position of the envelope. Thus it is possible to create a sealed letter in which the specifying information is observable from the window.

Further, the present apparatus automatically selects an optimum printing condition from the content information included in the sealed letter creation information set by the user and performs print processing on the print sheet P. Thus it is possible to omit the setting of a printing condition by sealed letter, and easily create a desired sealed letter.

OTHER EMBODIMENTS

Note that the present invention is not limited to the above embodiment, and may be arbitrarily changed and implemented in correspondence with use environment as follows. Further, the following modifications may be arbitrarily combined and implemented within a range not departing from the subject matter of the present invention.

In the above-described embodiment, the sealed letter creation device 100 to which the printing apparatus 1 according to the present invention is connected has an apparatus configuration to create a sealed letter by wrapping the print sheet P, subjected to predetermined folding as a content, with the envelope form PE. However, the present invention is not limited to this configuration. For example, it is possible to acquire the same advantage as that obtained with the above-described embodiment with an enclosing-sealing device (e.g. a device disclosed in Japanese Published Unexamined Patent Application No. 2012-131543) to enclose the print sheet P to be a content into a commercial envelope without folding.

When the printing apparatus 1 according to the present invention is applied to this enclosing-sealing device, at least printing surface information as content information is required when selecting a content printing condition. Then the conveyance path after printing (single-sided conveyance path/double-sided conveyance path), the execution/non-execution of image rotation (execution of rotation/non-execution of rotation), and the printing page order (ascending order/descending order) are arbitrarily selected with the printing condition selection and processing part 7*a* for alignment with the position of the window of the envelope in accordance with whether the printing surface information of the print sheet P is "single-sided printing" or "double-sided printing".

Note that in this example, since folding is not performed on the content, the folding information as the content information is not necessary. Further, when the printing surface information of the print sheet P is "double-sided printing", a conveyance path after printing is not selected as in the case of the above-described embodiment. The print sheet P, in the status after the double-sided printing, is conveyed to the enclosing-sealing unit 120.

Further, in the above-described example, an envelope having a window to observe the specifying information printed on the print sheet P is used. However, the present invention is not limited to this envelope. For example, it may be configured such that information of a greeting printed on the content or information printed on the surface of the bunch of contents is regarded as specifying information, and a content printing condition is selected such that the specifying information is aligned with a predetermined position in the envelope (e.g. a position opposite to a surface of the envelope on which an addressee is written) when the content is enclosed in the envelope. With this configuration, when the sealed letter is opened, the surface of the bunch of contents or the greeting is the upper surface. The addressee can infallibly check the specifying information.

Further, in the above-described embodiment, the printing apparatus 1 has the storage section 6 and the control section 7. It may be configured such that the integrated storage section 127 and the integrated control section 128 of the sealed letter creation device 100 in which the present apparatus is incorporated perform the functions of the storage section 6 and the control section 7.

REFERENCE SIGNS LIST

1 . . . Printing apparatus
2 . . . Paper feeding section
3 . . . Convey section (3*a* . . . horizontal conveyance path, 3*b* . . . circular path, 3*c* . . . paper discharge path, 3*d* . . . switchback path)
4 . . . Printing section
5 . . . Paper discharge section
6 . . . Storage section
7 . . . Control section (7*a* . . . printing condition selection and processing part)
100 . . . Sealed letter creation device
110 . . . Printing unit (printer)
120 . . . Enclosing-sealing unit (enclosing-sealing device)
P . . . Print sheet
PE . . . Envelope form

The invention claimed is:

1. A printing apparatus comprising:

a printing section that prints specifying information on a front side or a rear side of a content to be folded and enclosed in an envelope with a window; and a control section that makes determination as to execution or non-execution of image rotation of the specifying information to be printed on the content by the printing section and as to whether the content is printed in an ascending order or descending order of page numbers by comparing content information including printing surface information to set a printing surface of the content to single-sided or double-sided and folding information to set folding of the content, with content printing condition associated with information indicating an order of printing pages based on the folding information and the printing surface information and information indicating the execution or non-execution of the image rotation, so as to align the specifying information of the content enclosed in the envelope with a predetermined position in the envelope which is seen through the window.

2. The printing apparatus according to claim 1, wherein the content printing condition includes information for determining whether the content after single-sided printing is conveyed on a single-sided conveyance path or a double-sided conveyance path is also made.

3. The printing apparatus according to claim 1, wherein the folding information includes information as to whether folding is inward three-folding, four-folding, outward three-folding, or two folding.

* * * * *